(12) United States Patent
Maul et al.

(10) Patent No.: US 10,584,959 B2
(45) Date of Patent: Mar. 10, 2020

(54) WELDABLE FBG STRAIN SENSOR ARRANGEMENT

(71) Applicant: HOTTINGER BALDWIN MESSTECHNIK GMBH, Darmstadt (DE)

(72) Inventors: Jochen Maul, Mainz (DE); Tobias Kipp, Darmstadt (DE); Bernd Günther, Karlsruhe (DE); Maria Marta Cabral Bobião Girão, Leca do Balio (PT); Francisco Manuel Moita Araújo, Matosinhos (PT)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 0 days.

(21) Appl. No.: 16/464,990

(22) PCT Filed: Jul. 24, 2017

(86) PCT No.: PCT/DE2017/000225
§ 371 (c)(1),
(2) Date: May 29, 2019

(87) PCT Pub. No.: WO2018/099501
PCT Pub. Date: Jun. 7, 2018

(65) Prior Publication Data
US 2019/0277627 A1    Sep. 12, 2019

(30) Foreign Application Priority Data

Nov. 30, 2016  (DE) .................. 10 2016 014 280

(51) Int. Cl.
*G01B 11/16* (2006.01)
*G01L 1/24* (2006.01)
(Continued)

(52) U.S. Cl.
CPC ............ *G01B 11/165* (2013.01); *G01B 11/18* (2013.01); *G01L 1/246* (2013.01); *G02B 6/02209* (2013.01); *G01D 5/35316* (2013.01)

(58) Field of Classification Search
CPC ....... G01L 1/246; G01B 11/18; G01B 11/165; G02B 6/022; G02B 6/02209; G01D 5/35316
See application file for complete search history.

(56) References Cited

U.S. PATENT DOCUMENTS 6,229,827 B1 * 5/2001 Fernald ................ G02B 6/0218
372/20
6,310,990 B1 * 10/2001 Putnam .................. G01L 1/246
385/12
(Continued)

FOREIGN PATENT DOCUMENTS

DE        2658324 C2     6/1982
DE       10335337 A1     3/2005
(Continued)

OTHER PUBLICATIONS

Baldwin et al, Fiber Optic Structural Health Monitoring System: Rough Sea Trials of the RV Triton (Year: 2002).*
(Continued)

*Primary Examiner* — Peter J Macchiarolo
*Assistant Examiner* — David L Singer
(74) *Attorney, Agent, or Firm* — Henry M. Feiereisen LLC

(57) ABSTRACT

A FBG strain sensor arrangement includes a sensor carrier of steel sheet to which a FBG strain sensor is fastened. A protective cover has a first part configured thin and narrow and bonded to the sensor carrier along an optical fiber so that the optical fiber lying underneath is fixed with a fiber Bragg grating on the sensor carrier. The protective cover is enlarged at each end portion of the optical fiber to thereby
(Continued)

form a cavity underneath, with edges of the enlarged second part of the protective cover being bonded to the sensor carrier. Arranged in the cavity is an elastic filler which embeds the coupling points in a vibration damping manner. The protective cover with elastic filler accommodates thermal expansions and functions for dynamic measurements by the vibration damping.

8 Claims, 4 Drawing Sheets

(51) Int. Cl.
G02B 6/02 (2006.01)
G01D 5/353 (2006.01)

(56) References Cited

U.S. PATENT DOCUMENTS

| | | | | |
|---|---|---|---|---|
| 6,586,722 | B1* | 7/2003 | Kenny | G01L 1/246 250/227.16 |
| 7,796,843 | B2* | 9/2010 | Song | A61B 5/1107 385/12 |
| 8,503,834 | B2* | 8/2013 | Arkwright | G01L 1/246 385/13 |
| 2002/0009252 | A1 | 1/2002 | Maron et al. | |
| 2002/0028034 | A1* | 3/2002 | Chen | G01L 1/242 385/12 |
| 2002/0092976 | A1* | 7/2002 | Sugai | G01L 1/246 250/227.14 |
| 2003/0066356 | A1* | 4/2003 | Kanellopoulos | G01L 1/246 73/800 |
| 2004/0074307 | A1* | 4/2004 | Tjin | G01L 1/246 73/800 |
| 2004/0179765 | A1* | 9/2004 | Kersey | G01B 11/18 385/12 |
| 2004/0179766 | A1* | 9/2004 | Williams | G02B 6/02171 385/13 |
| 2007/0196059 | A1* | 8/2007 | Kojima | G01K 11/32 385/100 |
| 2012/0300807 | A1* | 11/2012 | Freitag | G01D 5/353 374/161 |
| 2014/0311250 | A1* | 10/2014 | Maul | G01L 1/246 73/800 |
| 2016/0216166 | A1* | 7/2016 | Kwon | G01B 1/00 |
| 2016/0299017 | A1* | 10/2016 | Wakahara | G01B 11/18 |

FOREIGN PATENT DOCUMENTS

| | | | |
|---|---|---|---|
| DE | 102011118526 A1 | * | 5/2013 |
| DE | 102011118527 A1 | * | 5/2013 |
| EP | 1148324 A2 | | 10/2001 |
| JP | 2005337831 A | * | 12/2005 |
| JP | 4519703 B2 | | 5/2010 |

OTHER PUBLICATIONS

Enami et al, Fiber strain sensor using low reflective fiber Bragg gratings, 2005 Conference on Lasers & Electro-Optics (CLEO) (Year: 2005).*
Machine Translation DE102011118527 (Year: 2019).*
Machine Translation JP2005337831 (Year: 2019).*
International Search Report issued by the European Patent Office in International Application PCT/DE2017/000225.

* cited by examiner

WELDABLE FBG STRAIN SENSOR ARRANGEMENT

CROSS-REFERENCES TO RELATED APPLICATIONS

This application is the U.S. National Stage of International Application No. PCT/EP2017/000225, filed Jul. 24, 2017, which designated the United States and has been published as International Publication No. WO 2018/099501 and which claims the priority of German Patent Application, Serial No. 10 2016 014 280.4, filed Nov. 30, 2016, pursuant to 35 U.S.C. 119(a)-(d).

BACKGROUND OF THE INVENTION

The invention relates to a weldable FBG strain sensor arrangement that is versatile in use due to its easy-to-vary and cost-effective construction.

Strains of material surfaces can e.g. be measured with strain sensors, which are mounted on these surfaces. When the surface is stretched or compressed, the strain sensors are impacted thereby, so that a measurement signal is generated.

In many cases, so-called strain gauges are used as strain sensors and secured by an adhesive on the surface to be measured. These strain gauges are made of epoxy-impregnated paper or a glass fiber fabric, on which a thin metal foil is attached. Strain gauges of this type can be used for a wide range of applications, because they can be attached at almost any location of a workpiece. Disadvantageous, however, is the substantial complexity of their attachment. There are situations in which such so-called metal foil strain gauges cannot be used. Upon their attachment, certain parameters such as ambient and workpiece temperatures and air humidity must be observed. Also, after the strain gauge has been attached, the measuring point must be protected against mechanical damage and ingress of moisture. This is achieved by protective covers. Against ingress of moisture, an adhesive film is used with an embedded water vapor barrier made of aluminum. In the event of great temperature fluctuations, this moisture protection may detach, however. In the case of dynamic measurements, shear forces occur at the measuring point and may also cause the detachment of this moisture protection. When a protection against mechanical contact is required in addition, a housing made of a mechanically resistant material is attached over the measuring point.

In order to avoid the afore-described cumbersome assembly steps, already encapsulated weldable strain sensors are used, such as e.g. shown in the documents DE 2658324 C2, JP 4519703 B2 and DE 10335337 A.

Document DE 10335337 A1 describes a so-called multipurpose strain sensor. This multipurpose strain sensor is mechanically robust and well protected against moisture, but has a complicated structure, as can be seen in FIG. 1 of the document DE 10335337 A1.

The object of the present invention is the provision of a robust strain sensor construction which, compared to the prior art, is significantly simpler in structure.

SUMMARY OF THE INVENTION

The object is achieved by an FBG strain sensor arrangement, which includes a sensor carrier of steel sheet, on which at least one FBG strain sensor is attached. The FBG strain sensor is an optical fiber having two end portions between which at least one Bragg grating is provided. An optical line is coupled to each of the end portions in order to transmit the generated measurement signals. The optical fiber with the Bragg grating and the coupling points are surrounded by a protective cover and bonded thereto.

This protective cover has the following features:

Along the optical fiber, the protective cover is thin and narrow and bonded to the sensor carrier, so that the optical fiber is fixed thereon and protected from above.

At each of both end portions of the optical fiber, i.e. in the region of the respective coupling point with the signal line, the protective cover is of enlarged configuration and also bonded to the sensor carrier.

An elastic filler is arranged in an existing cavity under the protective cover.

The protective cover has a multiple function:
The protective cover serves along the optical fiber with the Bragg grating for attachment of the optical fiber onto the sensor carrier while providing relatively good protection against contact. The thin walls on the enlarged part of the protective cover serve to accommodate differences in expansion caused by different thermal expansion coefficients of steel and plastic. If each of the two enlarged end portions of the cover were to be made entirely of plastic in the absence of a cavity underneath, the different material expansions could result in a detachment of the sensor carrier from the workpiece surface, so that then a mechanical connection between the sensor carrier and the workpiece surface would remain only along the optical fiber with the Bragg grating. In this case, the sensor would already be destroyed, when subjected to even low mechanical stress. Furthermore, the thin-walled enlarged end portions of the cover are filled with elastic fillers. The reason is as follows: Dynamic measurements could cause the ends of the optical fiber to vibrate mechanically at certain frequencies. This would lead to breakage of the optical fiber and thus cause the total failure of the sensor.

In an advantageous refinement of the FBG strain sensor arrangement, the sensor carrier is narrower in the region of the optical fiber than in the region of the enlarged end portions of the protective cover. As a result, weight and thus mass moment of inertia of the sensor carrier are reduced, thereby reducing stress on the welding points between the sensor carrier and the workpiece surface during dynamic measurements.

In an advantageous refinement of the FBG strain sensor arrangement, the protective cover is made of epoxy resin. Epoxy resin has excellent adhesive properties, high strength and high resistance to moisture and aggressive environmental conditions.

In an advantageous refinement of the FBG strain sensor arrangement, the protective cover has semicircular configuration. As a result, high resistance to external pressure, as known from static, is achieved.

In an advantageous refinement of the FBG strain sensor arrangement, the optical signal lines have a steel reinforcement. This increases overall robustness of the FBG strain sensor arrangement.

In an advantageous refinement of the FBG strain sensor arrangement, the protective cover is maximal 3 times as wide and maximal 2.5 times as thick as the diameter of the optical fiber in the region of the Bragg grating. This improves measuring accuracy.

In an advantageous refinement of the FBG strain sensor arrangement, the sensor carrier is configured as a triangle, with an FBG strain sensor being attached on each side of the triangle.

In an advantageous refinement of the FBG strain sensor arrangement, the sensor carrier is configured as a rectangle, with an FBG strain sensor being attached on each side of the rectangle.

The afore-described refinements show that any shapes and sizes of the sensor carrier can be produced, e.g. by laser cutting.

BRIEF DESCRIPTION OF THE DRAWING

The invention will be explained in greater detail hereinafter with reference to exemplary embodiments and drawings.

DETAILED DESCRIPTION OF PREFERRED EMBODIMENTS

Figure 1:
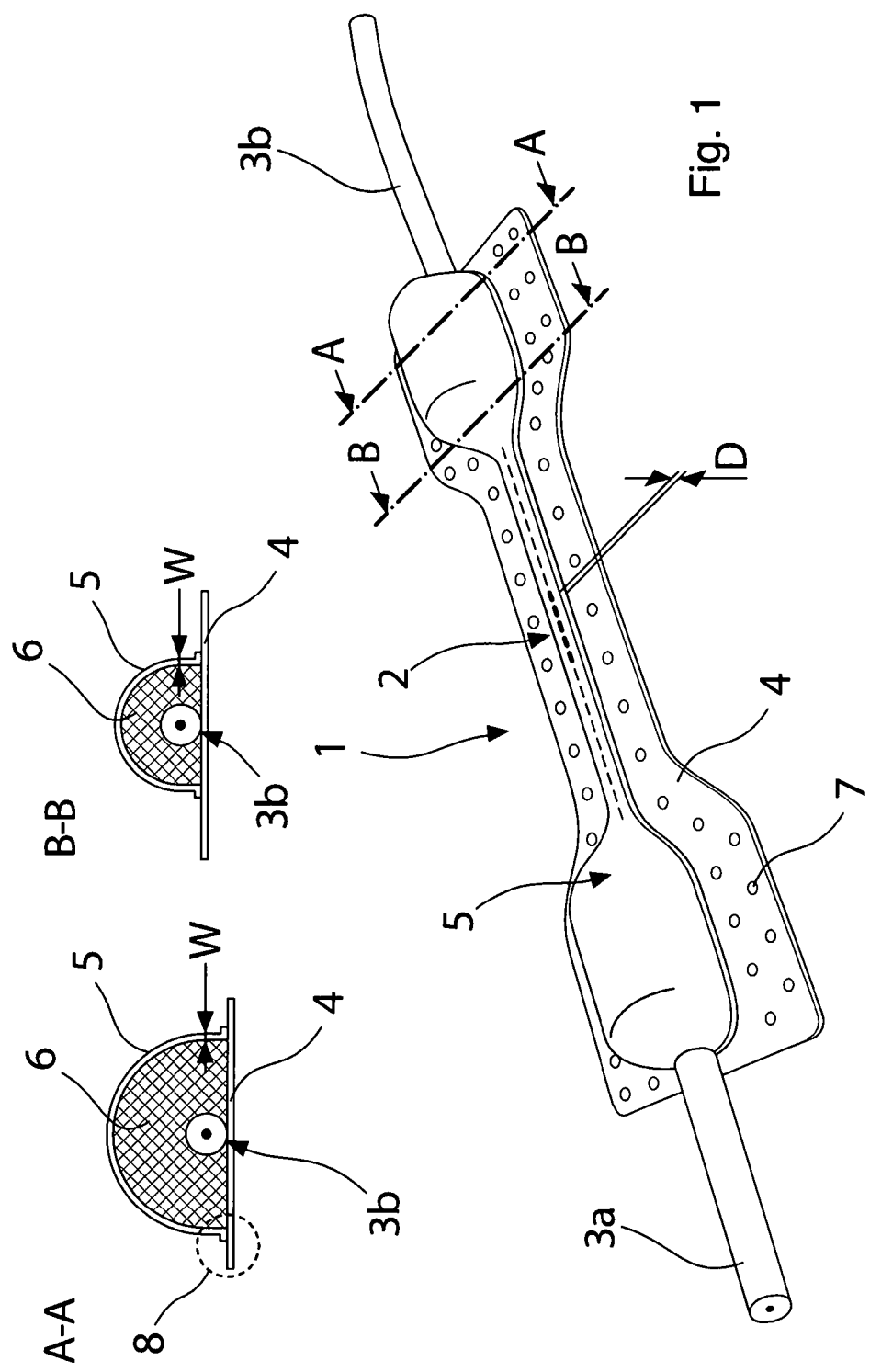
FIG. 1 shows a perspective view of a weldable strain sensor and two sectional views A-A and B-B thereof.

FIG. 1 shows a perspective view of a weldable strain sensor arrangement 1. An optical fiber with an FBG strain sensor 2 is shown as a dashed line and mechanically connected at its two end portions for transmitting an optical measurement signal in signal communication with steel-reinforced signal lines 3a, 3b. The steel reinforcement is provided to render the strain sensor arrangement mechanically robust. The optical fiber 2 with the FBG strain sensor is bonded onto a sensor carrier 4 of steel sheet. In this exemplary embodiment, the steel sheet has a thickness of 0.1 mm and a tensile strength of 884 N/mm$^2$.

The optical fiber with the FBG strain sensor 2 and coupling points to the signal lines 3a, 3b are continuously covered with a protective cover 5 of solid plastic. In the present exemplary embodiment, epoxy resin is used because it is particularly strong and resistant to aging. The protective cover 5 is firmly connected to the sensor carrier 4 at each point.

In the region of the optical fiber with the FBG strain sensor 2, the protective cover 5 is configured narrow and flat. In the present exemplary embodiment, the protective cover 5 has in this region a width of 2 mm and a thickness of 0.5 mm.

In the region of the optical fiber with the FBG strain sensor 2, the sensor carrier 4 is configured narrower than at its end portions. In the present exemplary embodiment, the end portions of the sensor carrier have a width of 23 mm, whereas the section between the end portions is only 11 mm wide. In this way, a good transfer of the elongation of the workpiece onto the FBG sensor is realized.

At each of both end portions of the optical fiber, i.e. at the coupling points with the signal lines 3a and 3b, the protective cover has an enlarged configuration and is bonded to the sensor carrier as well. As is apparent from the sectional views in FIG. 1 the protective cover is configured semicircular and thin-walled. In this exemplary embodiment, the wall thickness W in the region of the two end portions is 0.5 mm, i.e. It is of same size as the thickness D of the protective cover in the region of the optical fiber with the FBG strain sensor 2. Arranged in the cavity underneath the semicircular protective cover is an elastic filler 6, which assumes the function of a vibration damper. Vibration damping is particularly advantageous when strain measurements are involved, which are additionally superimposed by mechanical vibrations.

The sectional views A-A and B-B show the cross-section of the semicircular protective cover along the section lines A-A and B-B in the perspective view of the strain sensor arrangement of FIG. 1. It can be seen that the filler 6 fills the cavity of the semicircular protective cover.

Reference numeral 7 indicates fictitious welding points, which would be created when the sensor carrier 4 is mounted onto a workpiece surface through spot welding.

Reference number 8 designates an angled sealing zone which connects the thin semicircular protective cover 5 to the sensor carrier 4 and ensures that no leakage occurs.

Figure 2:
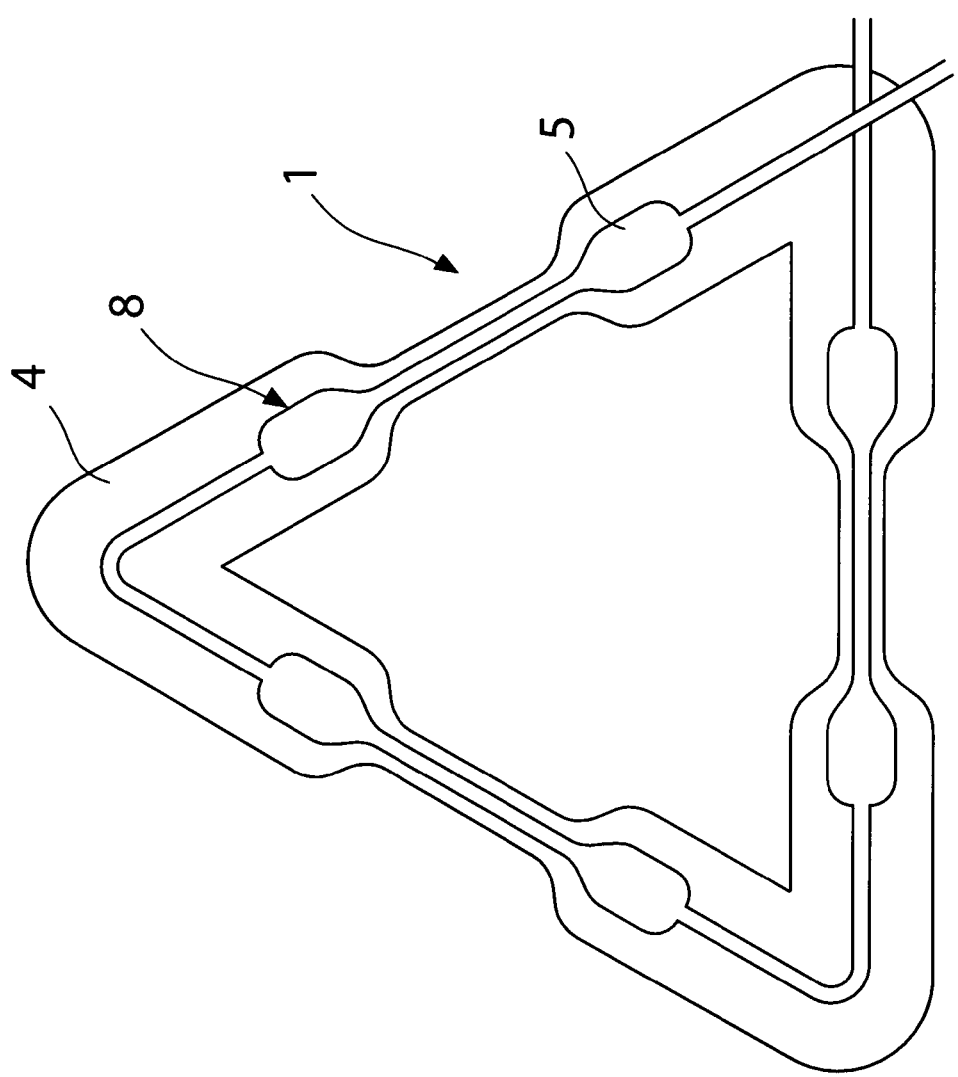
FIG. 2 shows a triangular sensor carrier with 3 FBG strain sensors mounted thereon.
Figure 3:
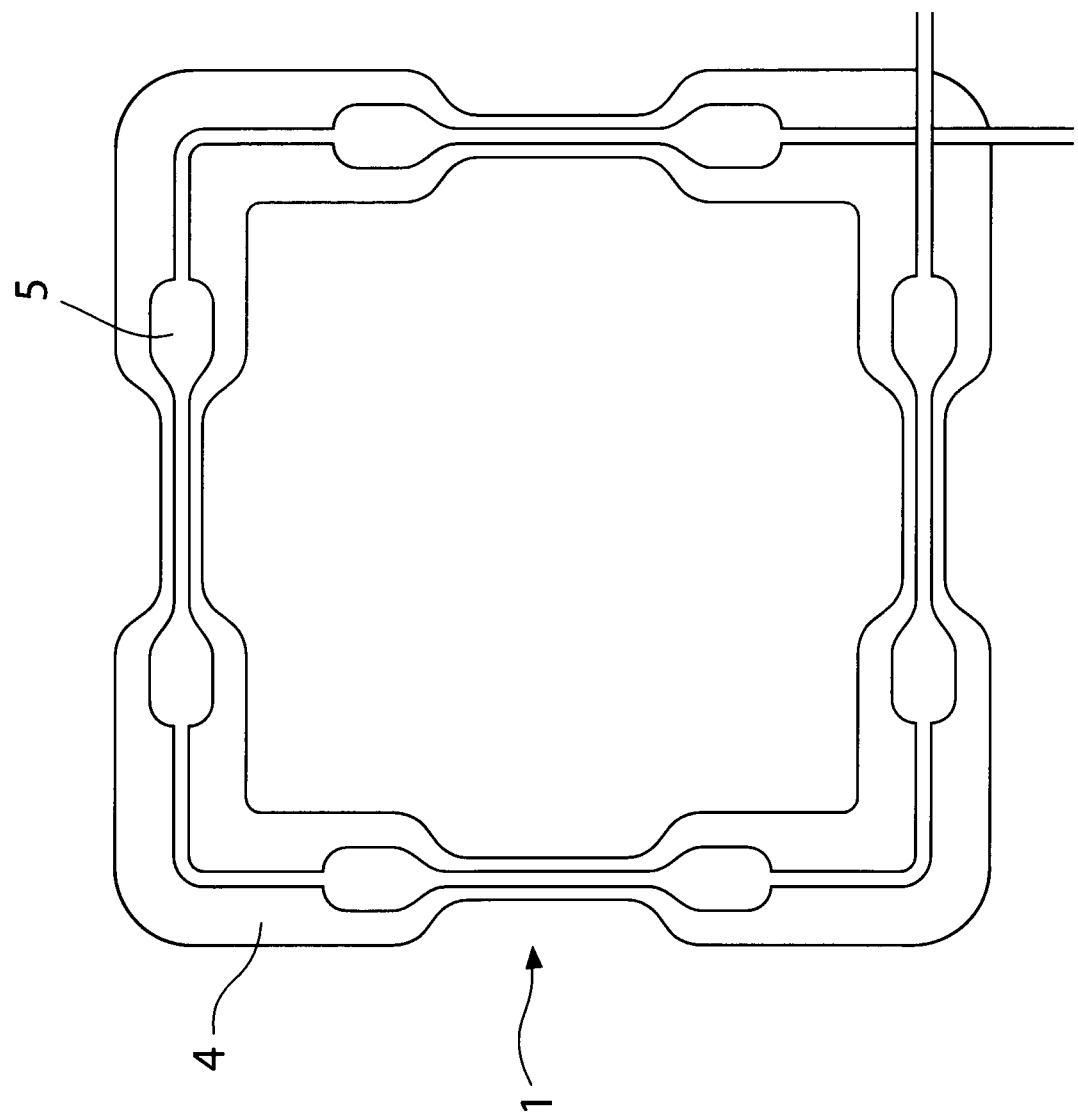
FIG. 3 shows a square sensor carrier with 4 FBG strain sensors mounted thereon.

The particular advantage of this FBG strain sensor arrangement resides in the very simple structure and its easy variability in shape. The sensor carrier 4 can be produced inexpensively by laser cutting in a variety of shapes. Likewise, the cover, which is made entirely of the same material, preferably of durable plastic, can be easily manufactured. FIGS. 2 and 3 show only two of the many design options of the sensor carrier and thus the FBG strain sensor arrangement.

Figure 4:
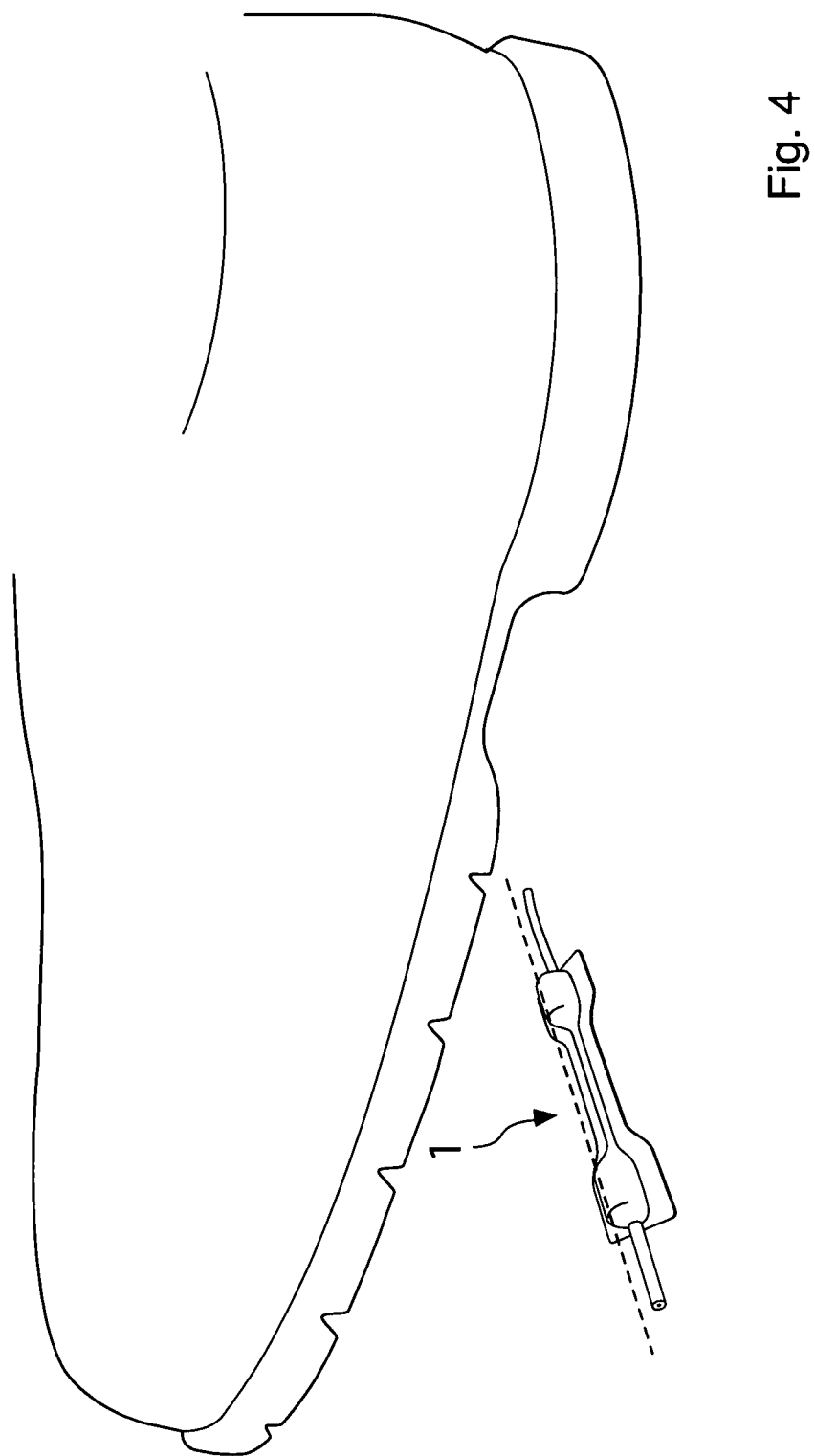
FIG. 4 shows symbolically the safety of the FBG strain sensor arrangement against foot traffic.

The steel reinforcement of the signal lines 3a, 3b and the semicircular curvature of the cover provide good protection of the sensor against a flat mechanical contact, e.g. by shoes as shown symbolically in FIG. 4. Therefore, the need for additional and elaborate protective measures may oftentimes be eliminated.

What is claimed is:

1. A fiber Bragg grating (FBG) strain sensor arrangement, comprising:
a sensor carrier of steel sheet;
a FBG strain sensor fastened to the sensor carrier, said FBG strain sensor including an optical fiber having two end portions;
a Bragg grating provided between the end portions;
optical signal lines coupled to the end portions, respectively, for transmission of a measurement signal;
a protective cover having a first part which is configured thin and narrow and bonded to the sensor carrier along the optical fiber, so that the optical fiber lying underneath is fixed with the Bragg grating on the sensor carrier, said protective cover having an enlarged second part at each of both end portions of the optical fiber at coupling points of the end portions with the optical signal lines to thereby form a cavity underneath, with edges of the enlarged second part of the protective cover being bonded to the sensor carrier; and
an elastic filler arranged in the cavity and embedding the coupling points in a vibration damping manner.

2. The FBG strain sensor arrangement of claim 1, wherein the sensor carrier is configured narrower in a region of the optical fiber than in a region of the enlarged second part of the protective cover.

3. The FBG strain sensor arrangement of claim 1, wherein the protective cover is made of epoxy resin.

4. The FBG strain sensor arrangement of claim 1, wherein the protective cover is configured to be semicircular.

5. The FBG strain sensor arrangement of claim 1, wherein the optical signal lines comprise a steel reinforcement.

6. The FBG strain sensor arrangement of claim 1, wherein the protective cover is maximal 3 times as wide and maximal 2.5 times as thick as a diameter of the optical fiber with the Bragg grating at least in a region of the Bragg grating.

7. The FBG strain sensor arrangement of claim 1, wherein the sensor carrier is configured as a triangle, with each side of the triangle having fastened thereon one of said FBG strain sensor.

8. The FBG strain sensor arrangement of claim 1, wherein the sensor carrier is configured as a rectangle, with each side of the rectangle having fastened thereon one of said FBG strain sensor.

\* \* \* \* \*